Aug. 9, 1938.　　　C. E. HAYMAKER　　　2,126,551
RUG MAKING IMPLEMENT
Filed July 13, 1937　　　2 Sheets-Sheet 1
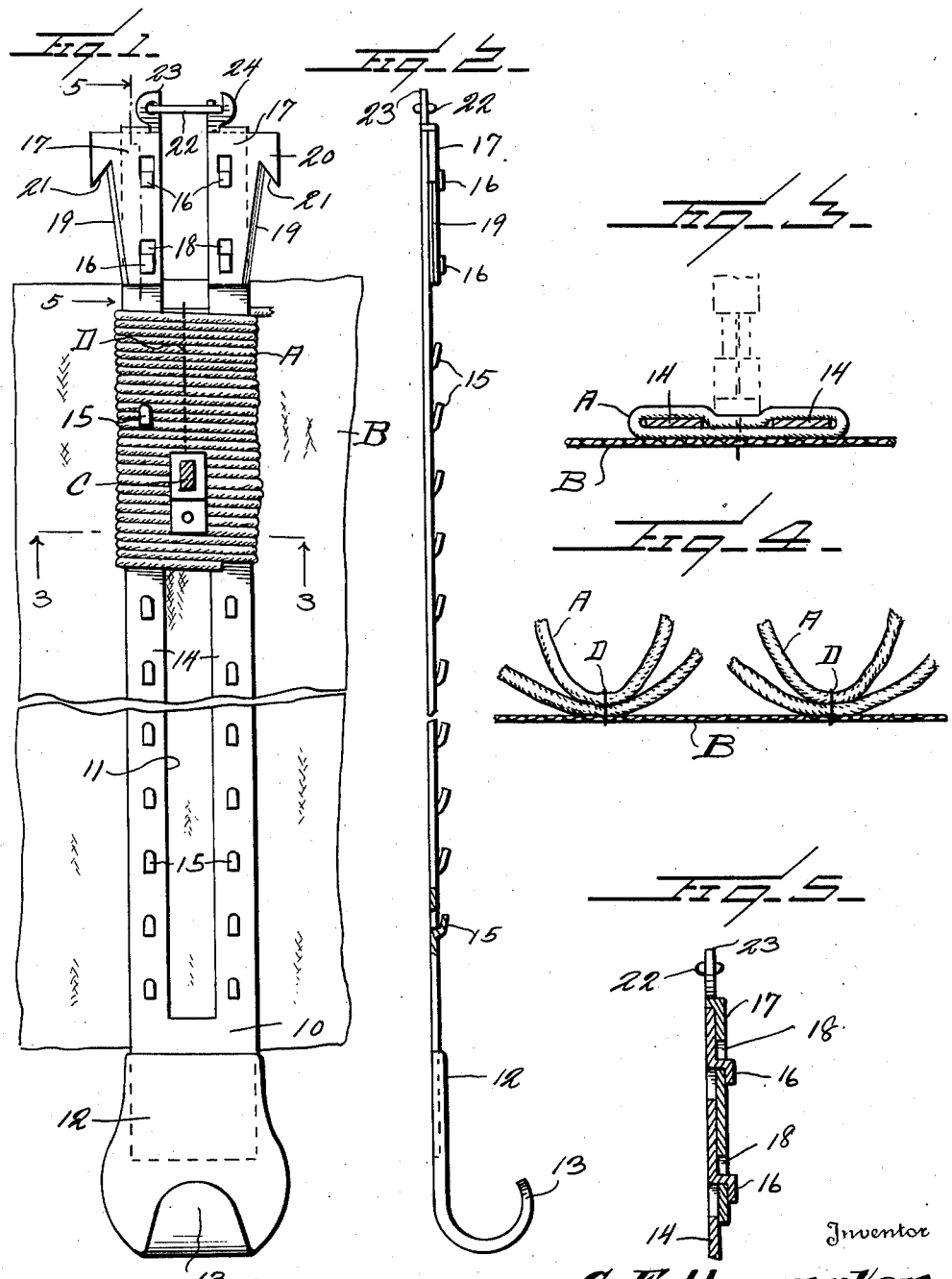

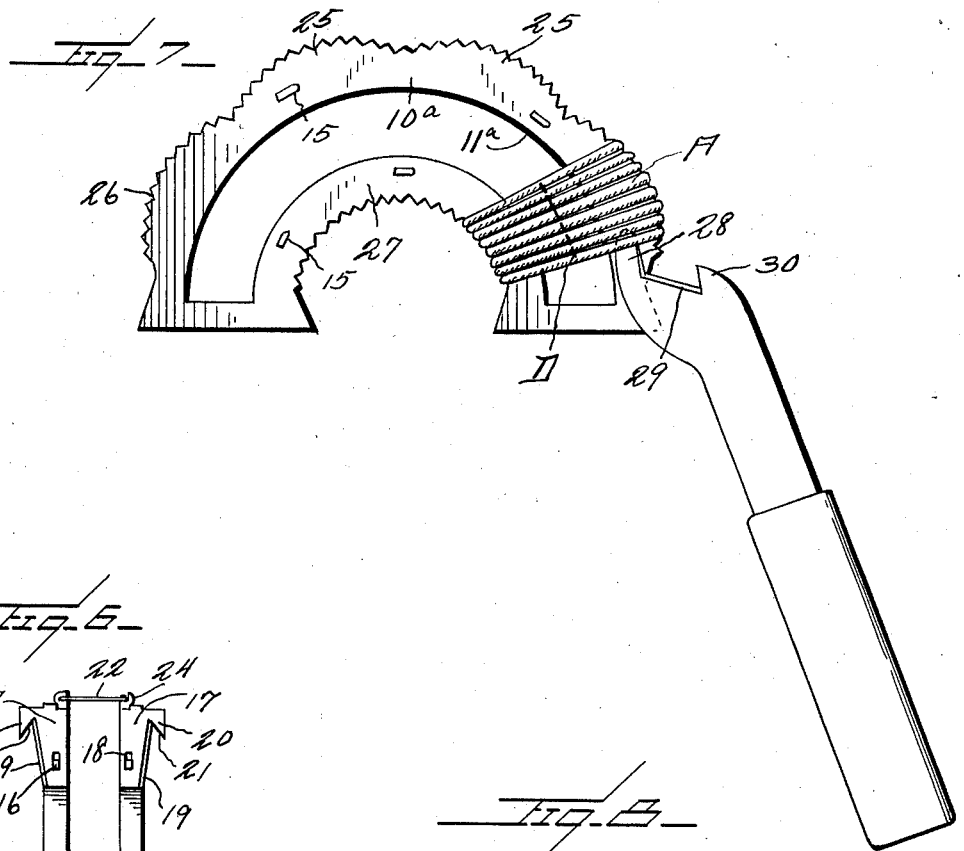

Patented Aug. 9, 1938

2,126,551

UNITED STATES PATENT OFFICE 2,126,551

RUG MAKING IMPLEMENT

Coral E. Haymaker, Bartlesville, Okla.

Application July 13, 1937, Serial No. 153,410

2 Claims. (Cl. 112—9)

This invention relates to devices for the manufacture of ornamental fabrics and particularly pile fabrics, fringed fabrics or the like, to be used as rugs, table covers, cushions or for any other purposes for which the fabric is suitable, and particularly to devices well known in the art for this purpose which are in the form of a fork over which closely spaced loops of yarn or other material are wound, the wound or wrapped material being then sewed to a base fabric by a line of stitches extending longitudinally of the slot of the fork and the loops so formed being then cut to produce closely spaced tufts.

The object of my invention is to improve upon the implements heretofore devised for this purpose by providing an implement having a very simple form and which may be cheaply made and readily used, and which is so constructed that the yarn wound around the implement will be held from movement along the implement as the stitches are being made through the wrapped yarn.

Another object is to provide means whereby the wrapped yarn may be cut after being sewed and by a withdrawal of the implement through the sewed and wrapped yarn.

A further object is to provide a device of this character in which the implement is so constructed that the slot of the implement will constitute a guide for the presser foot of the sewing machine so that there will be no danger of the operator allowing the stitches to vary from the correct path or straight line.

Other objects will appear in the course of the following description.

My invention is illustrated in the accompanying drawings wherein:

Fig. 1 is a plan view of a base fabric with the implement laid thereon and the wrapped yarn partially sewed.

Fig. 2 is an edge elevation of the implement shown in Fig. 1.

Fig. 3 is a section on the line 3—3 of Fig. 1, the presser foot being shown in dotted lines.

Fig. 4 is a fragmentary transverse section showing two rows of stitched yarn cut to form tufts.

Fig. 5 is a fragmentary section enlarged on the line 5—5 of Fig. 1.

Fig. 6 is a plan view of a slightly modified form of my rug making implement.

Figs. 7 and 8 are plan views of other forms used in making leaves, petals and flower designs, Fig. 7 showing the knife for cutting the yarn.

Referring to these drawings, 10 designates an implement which is preferably made of metal and has the form of an elongated strip of any desired width. This implement is formed with a longitudinally extending slot 11 extending from one end of the implement nearly to the other end thereof. This end of the implement has attached thereto a finger piece 12 having a curved hook-shaped terminal 13. While I have illustrated the finger piece as being separately formed from the implement, it will be understood that it might be formed in one piece therewith. This member 12 may be attached to the body of the implement by any suitable means.

The legs 14 of the implement 10 which define the slot 11 are formed at intervals with the outwardly and forwardly projecting hooks 15 which are preferably struck up from the metal of the implement and after the manner of pawls. These hook-shaped pawls all extend in the same direction and are disposed at an acute angle to the face of the implement, as shown most clearly in Fig. 2. The open end of the implement, as shown in Figs. 1 and 5, is formed with struck out hooks 16 which, as shown in Fig. 5, extend reversely to the hooks or pawls 15. These hooks 16 are for the purpose of holding upon the legs 14 the two knives 17. Each of these knives 17 is formed with a pair of slots 18 through which the corresponding hooks 16 are adapted to pass.

In applying the knives, the hooks 16 are inserted through the slots 18 and then the knives are forced outward, that is, toward the adjacent ends of the legs, thus holding the knives in place against accidental detachment but permitting the knives to be readily removed so that they may be sharpened or new knives substituted for old. Each of these knives 17 on its outer edge face is formed with the outwardly inclined cutting edge 19 which extends from a point approximately coincident with the outer edge of the corresponding leg 14 outward and forward for any suitable distance. The outer end of each knife 17 at the end of the cutting edge 19 is formed with the outwardly projecting lug 20 re-entrantly angled upon its inner edge face, as at 21.

For the purpose of holding the two legs 14 in parallel spaced relation to each other and at the same time provide for the opening of the slot 11 at its forward end when it is desired to remove the implement from within the wrapped yarn, I provide a link 22 which is pivoted upon an outwardly projecting lug 23 on one of the legs and which engages with a slot in an outwardly projecting lug 24 on the other leg. Thus the legs are prevented from being forced towards each other or forced away from each other in actual use and the two legs are held in absolutely parallel position.

In the use of this device, yarn or material of like nature and designated A is wrapped around the implement, as shown in Fig. 1, from a point adjacent the inner ends of the knives 17 to any desired distance upon the implement, it being understood that the implement may have any desired length. As the yarn is wrapped, the yarn may be passed beneath the acutely angled hooks 15 or, if the yarn is all one color, the yarn may be wrapped over these hooks. When the yarn has been entirely wrapped around the implement, the implement is laid upon the base fabric B and the fabric with the implement laid thereon is disposed so that the presser foot C of a sewing machine may travel longitudinally upon the top of the yarn and within the slot 11. The presser foot will depress the yarn into the slot, as shown in Fig. 3, and the slot having the same width as the standard presser foot, will act as a guide for the presser foot so that the implement with the base fabric B may be drawn in a straight line past the sewing machine needle and the presser foot. The reciprocations of the needle and the sewing machine will, of course, cause stitches D to be formed along the middle of the wrapped yarn A. After the wrapped yarn has been sewed to the base B along this medial line, the presser foot and needle of the sewing machine are, of course, raised and then the implement is drawn out from the coil or wrapping of yarn A, and as it is drawn out, the cutting edges 19 of the knives will sever the yarn at the edges of the wrapped yarn and will form tufts. Preferably two or more layers or wrappings of yarn will be wound upon the implement so that when the wrapping is cut, as shown in Fig. 4, there will be two layers of cut yarn projecting upward to form tufts. Of course, in withdrawing the implement, it is necessary that the link 22 be disengaged so as to permit the legs to pass the stitches D.

Preferably one row of yarn tufts will be made, then the space for the next adjacent row will be skipped and another row of yarn tufts be formed, etc. Then the operator places the implement successively in the spaces between the cut rows of tufts and these intermediate spaces are then filled with yarn. By this means, the implement 10 will be guided by the rows of stitches D already formed and thus the rows of tufts may be readily disposed in parallel relation to each other.

The particular purpose of the hooks or pawls 15 is to provide means whereby different colored yarn may be wrapped and held upon the implement, thus any desired number of wraps may be made of pink yarn. Then the end of the pink yarn may be caught beneath one of the pawl-like hooks 15, as shown in Fig. 1, then another wrapping may be made of blue yarn, for instance, and then the ends of this yarn caught within the pawl-like hoops 15, another wrapping of pink yarn may be made and so on. Thus by the use of these hooks 15, the yarn ends are held in place until the stitching has been completed. The pawl-like hooks 15, of course, extend in a direction reverse to the direction in which the implement is pulled to release it from the yarn wrappings and, of course, form no impediment to the withdrawal of the implement from the coiled or wrapped yarn.

The laterally projecting lugs 20 are for the purpose of keeping the yarn or threads from slipping over the end of the implement shown in Fig. 1, without the threads being cut.

In Fig. 6, I have illustrated another form of implement designed to be used for finishing up around flowers and other small designs where the implement shown in Fig. 1 would be too large for such use. This construction is practically the same as that shown in Fig. 6, except that it is smaller and is not provided with the projecting hooks 15. In view of the fact that the implement shown in Fig. 6 is the same as that shown in Fig. 1, the same reference numerals have been used.

In Figs. 7 and 8, I have illustrated two modifications of the implement which are used for forming flower designs and leaf designs and designs of like character. In Fig. 7, the implement 10ª is semi-circular in general form and is provided with an approximately semi-circular slot 11ª corresponding to the slot 11 in Fig. 1. The exterior edge of the arcuate implement is shown as formed with a plurality of crests and valleys 25 which are toothed at 26. The interior edge 27 of the implement is also toothed in the same manner. With this construction, the yarn A is wound around the implement in the manner illustrated in Fig. 7, the implement is applied to the cloth and then the yarn is sewed along the line D as previously described, and after the yarn has been so sewed, the ends of the yarn are cut by means of the implement shown in Fig. 7. This implement has a handle and a blade, the blade being formed with a projecting finger 28 having a cutting edge and at the base of the blade there is a rearwardly and outwardly directed portion 29 also having a cutting edge, and rearward of this cutting edge 29 there is a projecting lug 30, this lug acting to keep the threads from slipping over the implement without being cut. In Fig. 8, I have illustrated an approximately oval implement having an elliptical opening 31 and two serrated or toothed outwardly bowed edges 32. This implement is used in the same manner as that shown in Fig. 7, that is, by winding yarn across the implement, the yarn being held by the serrations and then after the yarn has been wound, the yarn is sewed through the opening 31 to the cloth, and then the ends of the yarn are cut in the manner shown in Fig. 7.

These two Figs. 7 and 8 illustrate the fact that the principle of my device may be applied to implements of different forms for the purpose of forming a large number of different designs for rug tufting. Obviously the serrations 32 or 26 will hold the yarn from slipping and will permit different colored yarn to be used. In Fig. 7, it is also illustrated that the side walls of the implement might be provided with the outwardly projecting hooks 15ª if desired. Only two of these hooks have been shown but it is to be understood that these hooks might extend along the full length of the implement shown in Fig. 7 or Fig. 8.

It will be seen that my device is very simple, that it can be cheaply made, that it is particularly adaptable to using vari-colored yarn, that it constitutes a guide for the presser foot of the sewing machine and, therefore, for the needle, thus preventing any deviation on the part of the operator from a straight line, and that it cuts the yarn as far as possible away from the stitches D.

What is claimed is:—

1. An implement of the character described, formed of a flat and relatively narrow strip of metal, the strip being longitudinally slotted from one end nearly to the other, the last named end of the strip having a handle, the strip being formed at uniform intervals with hooks, the hooks projecting from the face of the strip on each side of the slot and extending at an acute angle to the face of the strip toward the open end of the slot.

2. An implement of the character described, formed of a flat relatively thin strip of metal, the strip being longitudinally slotted from one end nearly to the other, the last named end being provided with a hook-shaped handle, the slot defining two legs, the outer ends of said legs adjacent the open end of the slot having each a plurality of hooks extending toward the handle, the outer ends of the legs at the open end of the slot having means whereby the gap between the legs may be detachably closed, the legs between the first named hooks and the handle being provided at uniform spaced distances with outwardly extending pawls, the pawls extending toward the open end of the slot at an acute angle to the face of the implement, the slot having a width slightly greater than the width of a standard sewing machine presser foot, and knives detachably engaged with the first named hooks and having slots to receive said hooks, the knives having their lateral edges outwardly inclined and sharpened.

CORAL E. HAYMAKER.